United States Patent [19]

Player et al.

[11] Patent Number: 4,643,907

[45] Date of Patent: Feb. 17, 1987

[54] SAVORY, FLAVORED BAKING CHIPS

[75] Inventors: Kenneth W. Player, Olmsted Falls; Lonny L. Wilson, Brunswick, both of Ohio

[73] Assignee: SCM Corporation, New York, N.Y.

[21] Appl. No.: 701,468

[22] Filed: Feb. 14, 1985

[51] Int. Cl.$^4$ ............................ A23D 5/00; A23G 3/00
[52] U.S. Cl. .................................. 426/580; 426/582; 426/583; 426/613; 426/653
[58] Field of Search ............... 426/582, 583, 588, 607, 426/613, 580, 653

[56] References Cited

U.S. PATENT DOCUMENTS

| | | | |
|---|---|---|---|
| 3,652,299 | 3/1972 | Penton . | |
| 3,814,825 | 6/1974 | Gilmartin | 426/361 |
| 3,843,808 | 10/1974 | Ziccarelli | 426/583 X |
| 3,857,977 | 12/1974 | Huessy | 426/189 |
| 3,966,993 | 6/1976 | Luck | 426/589 |

FOREIGN PATENT DOCUMENTS 0121253 10/1984 European Pat. Off. ............ 426/582

*Primary Examiner*—Robert Yoncoskie
*Attorney, Agent, or Firm*—Richard H. Thomas

[57] ABSTRACT

There is disclosed non-sweet, savory, flavored baking chips (e.g., cheese baking chip), a process for making the same, and use of the chips in a variety of food items, such as cookies, cakes, and other baked products.

8 Claims, No Drawings

SAVORY, FLAVORED BAKING CHIPS

The present invention relates to savory flavored baking chips, a process for making the same, and use of the chips in a variety of food items, such as cookies, cakes, and other baked products.

For purposes of the present application, the term "savory, flavored chips" means chips which have a fat matrix, are confectionery in appearance and texture, but are non-confectionery in the sense that they do not have a sugar base, and have a non-chocolate flavor of a food group such as cheese, meat, fish, fowl or vegetable (e.g., tomato or pizza).

Preferably, the baking chips of the present invention are in the form of uniform, extruded pieces which are blendable into a baking mix by simple mixing or blending procedures.

For purposes of the present application, baking temperatures can be deemed to be in the range of about 350-400 degrees Fahrenheit, depending upon the end product being prepared. It is a principal characteristic of the baking chips of the present invention that they are essentially free of ingredients which are subject to browning by the Maillard reaction at baking temperatures within this range. Ingredients which are subject to browning or degradation at baking temperatures are invert sugars, such as lactose, maltose, fructose and dextrose, all base ingredients conventionally employed in confectionery products. By the term "essentially free", it is meant that these ingredients, if present, are present in less than discoloring amounts.

The savory baking chips of the present invention are hard at room temperature, have low microbiological activity, and are shelf stable, permitting their shipment and storage at room temperature or the shipment and storage at room temperature of baked products into which the chips have been incorporated. The baking chips readily melt in the mouth when eaten, thereby imparting desirable textural and flavor impacts in the products in which they are incorporated. By way of example, the chips of the present invention can provide a tomato flavoring, or a drying or astringent flavor impact resembling cheese, meat or chicken.

BACKGROUND OF THE PRESENT INVENTION

It is well known to provide confectionery chips suitable for including in baked products, such as chocolate chips. These chips are provided in a number of different chocolate flavors, for instance milk chocolate and bittersweet chocolate, and can also be provided in other flavors such as butterscotch or peanut butter flavor. However, the chips all have as at least a part of the particulate base, a large amount of sugar (sucrose). Sugar (sucrose) has a very dominant sweet flavor which would tend to mask other flavors, or be incompatible with other flavors, such as tomato flavoring, cheese, meat or chicken flavoring.

Applicants know of no baking chip formulations developed or marketed, other than the aforementioned, such as chocolate, buterscotch or peanut butter flavored chips, or more specifically, of baking chip formulations which are non-sweet. By the term "non-sweet", it is meant that sugar or other sweet polysaccharides, if present, would be present in less than a sweetening amount.

The patent literature describes fat-based, solid or hard products which have a non-sweet flavor. However, these have traditionally been formulated for the preparation of foods such as soups and gravies, by reconstitution with water, or for addition to salads and the like. The products are not suitable for use as chips at baking temperatures.

An example of the prior art is Penton U.S. Pat. No. 3,652,299, which describes a sauce concentrate, in the form of a brittle solid at normal room temperature, containing about 20-40% edible fat, about 20-40% starch, and about 20-40% food solids flavoring material. The concentrate is said to be readily dispersible in hot water (e.g., 212 degrees Fahrenheit). There is no reference to baking temperatures (300-400 degrees Fahrenheit). In the present invention, starch would not be a necessary, or even functional, ingredient.

The Gilmarten U.S. Pat. No. 3,814,825, describes chunked-cheese flavor compositions comprising a blend of hard and soft fats, and cheese-flavored dry material (about 40-95%). The product is said to resemble a cheese block or chunks of cheese, having the same texture and appearance. Here also, no reference is made to suitability of the product for use in food products subjected to baking temperatures.

A Huessy U.S. Pat. No. 3,857,977 describes an extruded cut product in the form of cubes or pellets, said to be suitable for addition to soups, salads and casseroles. The product contains about 11-18% vegetable oil, wheat flour, buttermilk solids, corn syrup solids, whey, soy and soy flour, and is said to have a cheese-like consistency. No numerical data is given with regard to the vegetable oil, or on the properties of the cubes or pellets (e.g., hardness and textures). As with the Penton patent, flour in the present invention would not be necessary or even functionally desirable.

Luck U.S. Pat. No. 3,966,993, assigned to assignee of the present application, describes a sauce bar having a glossy surface. The sauce bar contains about 4-60 parts fat, about 15-40 parts flour or starch, and about 5-45 parts condiment solids. The sauce bar is formulated primarily for addition to water, making on reconstitution, a flavored sauce.

In prior applications Ser. Nos. 592,176 and 597,557, filed Mar. 22, 1984 and Apr. 6, 1984, respectively now U.S. Pat. Nos. 4,569,847, issued 2/11/86, and 4,567,047, issued 1/28/86, respectively, both assigned to assignee of the present application, there is disclosed the concept of replacing cocoa powder and sugar of a confectionery coating with a cheese powder to make a cheese-flavored coating. The coatings may be applied to a farinaceous substrate such as crackers, croutons, bread sticks and pretzels, and also to non-farinaceous substrates such as meat centers. The formulations are not designed for use at high baking temperatures such as 300-400 degrees Fahrenheit.

In prior patent application Ser. No. 577,393, now U.S. Pat. No. 4,562,079, issued 12/31/85, also assigned to assignee of the present application, there is described the preparation of savory coatings which are substantially free of sugar, which have a chewy texture, and which have a recognizable but delicate non-chocolate, non-sweet flavor of a meat, vegetable, fowl or fish food group. The coatings comprise a matrix-forming amount of a hard butter, a flavoring amount of a flavoring material of at least one of said food groups, and an inert particulate bland base material in the hard butter. The base material is a blend of carbohydrates and proteins designed to provide friability, blandness and non-hygroscopicity, properties required of the coating. The presence of a minimum amount of a friable ingredient is important to achieve a desired particle size reduction during preparation of the coatings. The coatings of this invention, as with those of Ser. Nos. 592,176 and 597,557, are not suitable for use at high baking temperatures, for instance temperatures in the range of 300–400 degrees Fahrenheit.

DISCLOSURE OF INVENTION

The present invention resides in a savory non-sweet baking chip which has a brittle, hard texture and a recognizable non-chocolate, non-sweet flavor of a food group such as meat, vegetable, cheese, fish or fowl, or a combination of such food groups, comprising
  (a) a matrix-forming amount of a hard butter;
  (b) a flavoring amount of a flavoring material of at least one of said food groups;
  (c) an inert particulate bland base in said hard butter having a particle size sufficiently reduced to present a non-gritty texture;
  (d) said base being essentially free of ingredients subject to browning or deterioration at baking temperatures.

Preferably, the base is a blend of carbohydrates and proteins, at least a portion of the base being a friable ingredient in an amount effective to achieve a base average particle size reduction to less than about fifty (50) microns during processing of the chip.

The composition of the present invention is not designed for addition to water systems, and preferably is starch free in addition to being non-sweet, that is, free of a flavoring amount of sugar, and free of ingredients subject to browning.

A preferred hard butter is one having a Wiley Melting Point in the range of about 84–120 degrees Fahrenheit and an SFI index of at least about 40 at 80 degrees Fahrenheit and less than about 35 at 92 degrees Fahrenheit.

Processing the savory chips of the present invention is similar to processing chocolate chips wherein the average particle size of the solid non-lipid or base portion of the chip is reduced by refining to achieve a smooth mouth feel. The refining step is then followed by conching, a liquification process where the chip ingredients are subjected to high shear mixing at a temperature above the melting point of the fat. Following conching or liquifaction, the compositions are cooled and formed by extrusion or the like.

An alternative to refining is simply to reduce the particle size of the base materials using known comminuting means and then adding the same to a molten mix of the lipid ingredients, using good mixing equipment. In this procedure, conching may be unnecessary.

Products with which the chips of the present invention can be used are cakes, biscuits, and cookies, or in general any product which today uses known chocolate chips or the like.

BEST MODE FOR CARRYING OUT THE INVENTION AND INDUSTRIAL APPLICABILITY

The Inert Particulate Base

The inert particulate base comprises most of the baking chip composition of the present invention other than the added hard butter, which as stated is present in a matrix forming amount. As a general rule, the amount of hard butter will normally be in the range of about 10–35% of the chip composition, with the base ingredients being essentially the remainder.

Preferably, the base will be a blend of ingredients to impart certain properties to the final composition, a portion being, as mentioned, a friable ingredient in an amount effective to achieve a base average particle size reduction to less than about fifty (50) microns during chip preparation.

The reason for this is that the particles have to be essentially impalpable, or non-gritty, in the formed chips, and thus a sufficient portion has to have a friability factor approximately equivalent to that of sugar.

In addition, the base particles preferably are sufficiently bland in taste to avoid masking or adversely affecting the food group flavors which are added.

The particles also are preferably non-hygroscopic, equivalent in this regard as well, to sugar, to avoid water pickup prior to processing. Water can adversely affect processing during refining, and/or conching, causing undesired agglomeration, as is well known in confectionery practice.

The particles which best meet the above criteria are spray dried, dairy-derived food additives which are low in lactose content such as non-fat dry milk solids, whole milk solids, non-fat buttermilk solids, and combinations of these solids. These solids are non-sweet or bland, are friable, as with sugar, are non-hygroscopic, and are not subject to browning at baking temperatures. Whey powder is not a suitable base, being comprised of a large amount of lactose. The spray dried food additives such as non-fat dry milk solids and buttermilk solids all may contain amounts of lactose, but in small enough proportions (less than about 50%) and bound in the protein content so that browning is not a problem.

In combination with the above, the base can comprise amounts of particulate, friable materials such as certain bland proteins and low DE corn syrup solids. Examples of proteins within the scope of the present invention are defatted soy protein and caseinate. An advantage of a protein is that it provides nutrition and also an amount of astringency which may be desirable with certain flavors. An example of a low DE corn syrup solid is maltodextrin. As with the above-mentioned milk solids, the lactose in maltodextrin may be present in sufficiently small amount or bound in the protein that browning is not a problem.

Another category of particulates useful in the present invention is cheese powders. Prior application Ser. No. 402,844, filed July 29, 1982, now abandoned, assigned to assignee of the present application refiled as continuation application Ser. No. 597,557, now U.S. Pat. No. 4,567,047, contains a detailed description of dried cheese powder ingredients which may be employed. These may be employed as blends, or in combination with cheese flavors (which are cheese powders with other ingredients), as long as the cheese flavors are not high in invert sugars, such as lactose. The cheese powders are usually spray dried powders and, as with the milk powders, are low in free lactose content. They may have a relatively high butterfat and/or vegetable fat content of, for instance, about 20 to about 46%, although, broadly, the cheese powders can vary all the way from about 60% fat down to as little as 0–10% fat. Also within the scope of the present invention are enzyme modified cheese powders. The cheese powders are available in a number of different flavors, for instance, Swiss, Cheddar, aged or unaged, and, perhaps, colored or uncolored. Usually, the cheese powders are marketed with a moisture content of less than about 10%, preferably less than about 5%. The following Table 1 is a list of representative Swiss and Cheddar cheese powders and flavors that may be employed in the practice of the present invention, either alone or in blends:

solids, about 20-30% buttermilk solids, about 0-60% maltodextrin, and about 0-60% particulate protein.

**Basis total composition, with about 65-90% particulates, this equals about 26-54% cheese powders and about 54-26% dairy derived solids.

Many other bulking ingredients will be apparent to those skilled in the art, and many will be developed in the future since this is an area of rapidly developing

TABLE 1

CHEESE POWDERS

| Trademark | Flavor | Min. Fat Content | Moisture Content Max. | Ingredient Declaration |
|---|---|---|---|---|
| Beatreme 1326 | Aged Cheddar | 46% | 3.5% | Cheddar cheese solids/sodium phosphate |
| Beatreme 1412 | Mild Cheddar | 46% | 3.5% | Manufactured from uncolored non-aged Cheddar cheese. |
| Cheztone 100 | Cheddar | 32% | 4.0% | Cheddar cheese solids, cultured non-fat milk solids, whey solids, hydrogenated shortening, salt, sodium phosphate; |
| Cheztone 101 | Cheddar | 32% | 4.0% | same as Cheztone 100 but with coloring. |
| Beatone 101 | Cheddar (high flavor powder) | 46% | 3.5% | Cheddar cheese solids |
| Beatreme 1923 | Typical Swiss | 39% | 3.5% | Swiss cheese solids/sodium phosphate |
| Beatone 700 | Swiss flavor | 20% | 4.0% | Enzyme modified swiss cheese solids, non-fat milk solids, sodium citrate. |
| Cheztone 700 | Swiss | 20% | 4.0% | Swiss cheese solids, cultured non-fat milk solids, sodium phosphate. |

The cheese powders and flavors of Table 1 are marketed by Beatrice Foods Co. In addition to the cheese powders of Table 1, the following can be used:

TABLE 2

| | |
|---|---|
| Borden Co. #3653 | Cheddar cheese, hydrogenated vegetable oil, buttermilk solids, salt, sodium phosphate, sodium hexametaphosphate, citric acid, lactic acid, and artificial color. |
| Borden Co. #90 | Cheddar cheese, hydrogentated vegetable oil, condensed buttermilk, sodium chloride, disodium phosphate, sodium hexametaphosphate, citric acid, lactic acid, artificial color. |
| Borden Co. #87 | Swiss cheese flavoring powder alternative to Cheztone 700. |
| Land-O-Lakes Dried Process Cheese #5540 | Spray dried process cheese produced by removing moisture from processed American cheese by spray drying; fat content 46.5%, moisture 4%. |
| Land-O-Lakes #9809 | Spray dried Blue cheese produced by removing the moisture from aged Blue cheese; fat content 41%, moisture 4%. |
| Land-O-Lakes Cheddease 250 | Cheddar cheese in powder form - contains also buttermilk, whey, butter, salt, sodium phosphate, flavoring, MSG, coloring; fat content 25%, moisture 4%. |

The disclosure of Ser. No. 402,884, filed July 29, 1982, now abandoned, is incorporated by reference herein.

The base composition preferably comprises a blend of particulates, at least about 40% of the base composition being preferably spray dried dairy derived solids and combinations of such solids; e.g., buttermilk solids and non-fat dry milk solids. It is also preferred that at least about 40% of the base composition, for optimum flavor and texture characteristics, be particulates other than the dairy derived solids. For instance, a preferred cheese flavored baking chip will contain about 40-60% spray dried cheese powders and about 40-60% dairy-derived solids; e.g., about 20-30% non-fat dry milk solids, and about 20-30% buttermilk solids (based on the total amount of particulates).** Alternatively, a savory flavored chip other than a cheese flavored chip might contain about 40-60% dairy derived solids and about 40-60% blend of maltodextrin and protein solid. For instance, a bland fish, vegetable or meat flavored chip may comprise about 20-30% non-fat dry milk technology. The present invention in its broadest scope is not limited to specific ingredients. It is necessary primarily that they be bland or complementary in flavor with the dominant flavor desired, and that they be friable and non-hydroscopic. By being friable, as mentioned, they resist agglomeration and can be reduced in particle size so that they are substantially impalpable in the coating. For purposes of the present application, again, the term friable means that the bulking ingredients are capable of a size reduction to not substantially greater than fifty (50) microns average particle size.

Hard Butters and Lipid Phase

In the practice of the present invention, the hard butter can be any of a large number of confectionery hard butters in the marketplace. Preferably, they have a Wiley Melting Point in the range of about 84°-120° F., as determined by AOCS method Cc2-38, and an approximate solid fat index, as determined by AOCS method Cd10-57, of

| Temperature °F. | Approx. Solid Fat Index |
|---|---|
| 80 | more than about 40 |
| 92 | less than about 35 |

Preferably, the hard butter is non-lauric, a preferred hard butter, useful in the composition of the present invention being Kaomel (trademark SCM Corporation), having a Wiley Melting Point in the range of about 97°-101° F., an IV of about 59, and a solid fat index as follows:

| Temperature °F. | Approx. Solid Fat Index |
|---|---|
| 50 | 69 min. |
| 70 | 59 min. |
| 80 | 52 min. |
| 92 | 22 min. |
| 100 | 5 max. |
| 110 | 0 |

This hard butter is derived from a blend of hydrogenated soybean and cottonseed oil, as defined in U.S. Pat.

No. 2,972,541 by Cochrane et al, assigned to assignee of the present application.

A non-lauric hard butter is particularly preferred if a significant portion of the particulate ingredients contains an amount of butterfat or vegetable fat, such as do many cheese powders. Typically, a spray dried cheese powder may contain, as indicated above, broadly from zero to about 60% fat, although generally the fat content will be in the approximate range of about 20–46%. In such case, the fat content, e.g., butterfat, functions as a diluent to the hard butter. An advantage in the use of a non-lauric hard butter is that such diluent fat would be compatible, in turn providing an end product free of fat bloom or so-called speckling. A lauric hard butter generally can tolerate a diluent fat in an amount of only a few percentage points, e.g., up to 10% by weight based on hard butter weight.

In addition, the butterfat or vegetable fat in the particulate base ingredient usually is free, under chip processing and baking conditions, to blend with the hard butter in a sufficiently homogeneous way to alter properties of the lipid matrix. It is a characteristic of Kaomel that its fat solids content is sufficiently high at normal ambient temperatures that the chips of the present invention retain their physical characteristics despite the presence of the diluent fat. By way of example, a cheese powder present in an amount of about 30–50% basis total composition may contribute about 6–23% butterfat to the composition (assuming about 20–46% of the powder is fat). Even with such butterfat, the chip would have essentially those characteristics, in terms of appearance, hardness, and functionality in a product subjected to baking conditions, of the Kaomel above.

In this regard, it was mentioned above that the amount of hard butter added should be about 10–35% basis total composition. The principle consideration is that the total fat content be in the range of about 20–35%. If the butterfat content of the cheese powder is small, then the total fat content of about 35% would be essentially hard butter. If the butterfat content is high, contributing, say, 6–23% fat to the composition, then the hard butter content should be about 10–15%, basis total composition. Usually, the cheese powders will contribute at least about 6% fat to the total composition.

If the particulate base ingredient or ingredients are essentially free of a diluent fat, then a high solids lauric fat can be used as the matrix, one having a solids content at 80° F. of at least about 68. Such a fat is one marketed by SCM Corporation under the trademark Satina III, having a Wiley Melting Point of about 96°–100° F. The SFI data for this compound is

| Temperature °F. | Approx. Solid Fat Index |
|---|---|
| 50 | 76 min. |
| 70 | 76 min. |
| 80 | 68 min. |
| 92 | 12 max. |
| 100 | 1 max. |

The fat is fractionated and hydrogenated from palm kernal oil.

Other Ingredients

It may be desirable in the practice of the present invention to use an organic emulsifier which would function as a processing aid. Confectionery products traditionally are subject to surface defects, for instance fissuring. In the present instance, the use of relatively large amounts of protein, which is not as friable as sugar, can aggravate the situation. Depending upon processing conditions, they can tend to agglomerate, resulting in such conditions as surface speckling. The use of extrusion during manufacturing can lead to surface streaking. Emulsifiers tend to promote greater uniformity of product. One suitable emulsifier is Santone 3-1-S (trademark SCM Corporation), which is triglycerol monostearate (a polyglycerol ester of a fatty acid) having a Capillary Melting Point in the range of about 127° F.–131° F. This emulsifier is lipophilic and has an HLB of about 7.2. The emulsifier need not be lipophilic. Santone 8-1-S (trademark, SCM Corporation) which is octaglycerol monostearate, has a Capillary Melting Point of about 131°–137° F., and can also be successfully used. This compound has an HLB value of about 13 and is hydrophilic. Another suitable polyglycerol ester is octaglycerol monooleate (Santone 8-1-O, trademark SCM Corporation).

Examples of other suitable emulsifiers which can be used are partial glycerides of higher fatty acids such as mono-diglycerides; derivatives thereof such as lactylated mono-diglycerides and polyoxyalkylene derivatives; sorbitol and sorbitan esters of higher fatty acids. Higher fatty acids are $C_8$ and higher fat forming acids (e.g., up to $C_{22}$–$C_{28}$ and typically are $C_{11}$–$C_{18}$ fat forming acids. Specific such lipoidal emulsifiers include, for example, sorbitan monostearate, ethoxylated mono-diglycerides, ethoxylated sorbitan esters of higher fatty acids (e.g., polysorbate 60, 80, etc.), and other higher fatty acid esters of polyglycerol (from about 3 to 10 glycerol units. A very useful emulsifier blend, where the spray dried cheese powders are present in an amount of about 30–40% basis total composition, is a combination of octaglycerol monooleate, octaglycerol monostearate, and triglycerol monostearate.

The amount of emulsifier employed can vary between about 0.1% to about 8% (based on the weight of the entire composition) and essentially is dependent upon the respective amounts of other ingredients, what particulate ingredients are used, and Wiley Melting Points of the fat matrix employed and the diluent fat. The specific amount used is essentially that necessary to prevent fat separation (about 2–3%).

If desired, complete wetting of the base particles by the hard butter continuous phase may be facilitated by adding to the coating formulations of the present invention an amount of viscosity reducing lecithin. Normally, the amount of lecithin added is less than about 0.5%, based on the weight of the total coating formulation, following conventional confectionery formulation techniques. With about 30–35% total fat, no lecithin should be needed.

In addition to the above, the composition of the present invention can contain flavorants and colorants, in a flavoring and/or coloring amount. The flavorants can be oil or water soluble, and can be a part of the hard butter added or particulate base added. For instance, most of the cheese particulates listed above function as flavorants in addition to providing bulk or fill. They can be used with or without additional flavoring ingredients. Normally, the colorants and flavorants added as such, for a flavoring and/or coloring function alone, constitute only a very small proportion of the total composition.

Processing

Processing of the composition of the present invention follows conventional confectionery tecniques, primary objectives being to obtain homogeneity and particle size reduction. Both objectives can be carried out by using conventional confectionery refining techniques, or by separate particle size reduction of the base ingredients and adding the ground particulates to the lipid phase. Separate attrition of the base particles can be carried out in a number of ways, for instance in a hammer mill, a ball mill, or a roll mill.

Subsequent treatment, following refining or mixing, follows standard practice for making present commercially available chips, such as chocolate chips. For instance, refining may be followed by conching, a liquifaction process of prolonged, high shear mixing at a temperature above the fat melting point.

Forming of the chips preferably is by extrusion onto a plate conveyor followed by cooling in a cooling tunnel following conventional practice. In this procedure, the extrusion is under pressure through a plurality of nozzles. At the point beneath the nozzles, the belt is raised up to meet the nozzles and then withdrawn from the nozzles to give the characteristic tip given to most baking chips. To get this tip, the composition has to have good standup at extrusion temperatures (about 5° to 10° F. above melting point, or about 105°-108° F. for a cheese flavored chip), making the proportion of hard butter used critical.

Broadly, a cheese baking chip will have the following composition:

| Ingredient | Weight Percent (approx) |
| --- | --- |
| Hard butter | 10-30 |
| Spray dried cheese powders | 30-50 |
| Nonfat dry milk | 15-22 |
| Buttermilk solids | 15-22 |
| Santone 8-1-3 | 1.02 |
| Santone 8-1-O | 0.73 |
| Santone 3-1-S | 0.73 |
| Cheddar cheese flavor | 0.20 |
| Lecithin | 0-0.5 |

The fat content of the cheese powders is such that the total fat content of the composition is about 20-35%.

EXAMPLE I

The following is a specific cheddar cheese bakery chip composition:

| INGREDIENTS | PERCENT |
| --- | --- |
| Kaomel (Durkee) | 10.33 |
| Beatreme 1326 (Beatrice) | 45.62 |
| Skim Milk Solids | 20.69 |
| Buttermilk Solids | 20.69 |
| Santone 8-1-S (Durkee) | 1.02 |
| Santone 8-1-O (Durkee) | 0.73 |
| Santone 3-1-S (Durkee) | 0.73 |
| Artificial cheddar cheese flavor (Firmenich 2368302/TH) | 0.20 |
|  | 100.00 |

The following prototype formulations gave a pleasant eating sensation:
1. 20% chips in biscuits.
2. 35% chips in muffins.

We claim:

1. A savory non-sweet baking chip which is brittle, has a hard texture and a recognizable non-chocolate, non-sweet flavor of a food group from meat, vegetable, cheese, fish, or a combination of such food groups, comprising
    (a) about 10-35% hard butter having a Wiley Melting Point in the range of about 84°-120° F. and an approximate Solids Fat Index at 80° F. of more than about 40 and at 92° F. of less than about 35;
    (b) a flavoring material of at least one of said food groups;
    (c) the remainder being essentially an inert particulate bland base in said hard butter having a particle size sufficiently reduced to present a non-gritty texture;
    (d) said base being free of discoloring amounts of ingredients subject to browning or deterioration by the Maillard reaction at baking temperatures and selected from the group consisting of spray dried dairy derived solids, a particulate protein other than said dairy derived solids, maltodextrin and combinations thereof;
wherein said chip is made by (a) mixing the hard butter, flavoring and base together at a temperature above the melting point of the hard butter to obtain a uniform composition, and (b) forming said composition into said baking chip;
    said base particles having an average particle size less than about fifty microns.

2. The chip of claim 1 which is essentially free of sugar.

3. The chip of claim 1 wherein said base composition is about 40-60% spray dried dairy derived solids based on the base composition weight.

4. The chip of claim 1 which has the characteristic shape of a baking chip formed by extruding said composition, said composition having good standup at extrusion temperature.

5. The chip of claim 1 wherein said mixing comprises the steps of refining and conching.

6. The chip of claim 1 prepared by the steps of comminuting said base to a desired particle size and mixing the comminuted base with a molten mass of said hard butter.

7. A savory non-sweet baking chip which is brittle, has a hard texture and a recognizable non-chocolate, non-sweet flavor of a food group from meat, vegetable, cheese, fish, or a combination of such food groups, comprising
    (a) about 10-35% hard butter having a Wiley Melting Point in the range of about 84°-120° F. and an approximate Solids Fat Index at 80° F. of more than about 40 and at 92° F. of less than about 35;
    (b) a flavoring material of at least one of said food groups;
    (c) the remainder being essentially an inert particulate bland base in said hard butter having a particle size sufficiently reduced to present a non-gritty texture;
    (d) said base being free of discoloring amount of ingredients subject to browning or deterioration by the Maillard reaction at baking temperatures and comprising, based on total composition weight, about 30-50% spray dried cheese powder and about 30-44% spray dried dairy derived solids other than said cheese powder;
wherein said chip is made by (a) mixing the hard butter, flavoring and base together at a temperature above the melting point of the hard butter to obtain a uniform composition, and (b) forming said composition into said defined shape.

8. The chip of claims 3 or 7 wherein said dairy derived solids is a blend, in approximately equal amounts, of non-fat dry milk solids and non-fat buttermilk solids.

* * * * *